United States Patent
Jordy et al.

(10) Patent No.: US 12,140,556 B2
(45) Date of Patent: Nov. 12, 2024

(54) SYSTEMS AND METHODS FOR IDENTIFYING CRACKS IN WIND TURBINE COMPONENTS

(71) Applicant: General Electric Company, Schenectady, NY (US)

(72) Inventors: Daniel Edward Jordy, Glenville, NY (US); Bhaveshkumar Mahendrakumar Kachhia, Greenville, SC (US); Aaron Lee Sprague, Lebanon, OH (US); Dhanushkodi Durai Mariappan, Albany, NY (US); William Max Gobeli, Simpsonville, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 139 days.

(21) Appl. No.: 17/899,738

(22) Filed: Aug. 31, 2022

(65) Prior Publication Data
US 2024/0068974 A1    Feb. 29, 2024

(51) Int. Cl.
*G01N 27/24* (2006.01)

(52) U.S. Cl.
CPC .................. *G01N 27/24* (2013.01)

(58) Field of Classification Search
CPC ........................................ G01N 27/24
USPC ........................................ 340/657
See application file for complete search history.

(56) References Cited

U.S. PATENT DOCUMENTS

| | | | |
|---|---|---|---|
| 8,059,008 B2 * | 11/2011 | Marincak | G01N 27/24 340/657 |
| 11,011,722 B1 * | 5/2021 | Howard | H10K 50/18 |
| 11,342,736 B2 | 5/2022 | Wood et al. | |
| 2013/0336786 A1 | 12/2013 | Kissinger | |
| 2015/0204209 A1 * | 7/2015 | Nielsen | F03D 17/00 29/889 |
| 2017/0176536 A1 * | 6/2017 | Grubic | G01R 31/44 |
| 2020/0137891 A1 * | 4/2020 | Seo | H05K 3/181 |

(Continued)

FOREIGN PATENT DOCUMENTS

| | | |
|---|---|---|
| CN | 110809673 A | 2/2020 |
| CN | 110914536 A | 3/2020 |

(Continued)

OTHER PUBLICATIONS

European Search Report Corresponding to EP23193987 on Jan. 11, 2024.

(Continued)

*Primary Examiner* — Kerri L McNally
(74) *Attorney, Agent, or Firm* — Dority & Manning, P.A.

(57) ABSTRACT

A method for identifying damage in a component of a wind turbine includes placing a conductive element onto at least one surface of the component of the wind turbine. The method also includes electrically connecting the conductive element into an electrical circuit. Further, the method includes monitoring a status of the electrical circuit to identify the damage in the component. In particular, when the status of the electrical circuit is open, damage is likely present in the component, and when the status of the electrical circuit is closed, damage is unlikely present in the component. Moreover, the method includes transmitting the status of the electrical circuit to a user interface for display.

19 Claims, 11 Drawing Sheets

(56) References Cited

U.S. PATENT DOCUMENTS

2020/0149513 A1    5/2020  Spandley et al.
2020/0245458 A1*   7/2020  Miyata .................. H05K 3/388
2022/0243703 A1    8/2022  Spandley et al.

FOREIGN PATENT DOCUMENTS

| EP | 3575596 A1 | * | 12/2019 | ............. F03D 17/00 |
| EP | 3575596 B1 |   | 10/2021 | |
| JP | H04115151 A |  | 4/1992 | |
| JP | 3770988 B2 |   | 4/2006 | |

OTHER PUBLICATIONS

Coxworth, Paint-On "Sensing Skin" is Designed to Detect Damage in Concrete Structures, New Atlas, Science, Jul. 4, 2014, 8 Pages. https://newatlas.com/bridge-crack-sensing-skin/32833/.

* cited by examiner

SYSTEMS AND METHODS FOR IDENTIFYING CRACKS IN WIND TURBINE COMPONENTS

FIELD

The present disclosure relates generally to wind turbines, and more particularly, to systems and methods for remotely identifying cracks in components, such as pitch bearings or yaw bearings.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and a rotatable hub having one or more rotor blades mounted thereto. The rotor blades are typically mounted to the hub via respective pitch bearings that allow rotation of each of the rotor blades about a pitch axis. Thus, the rotor blades capture the kinetic energy of wind using known airfoil principles. For example, the rotor blades typically have the cross-sectional profile of an airfoil such that, during operation, air flows over the rotor blades producing a pressure difference between the sides. Consequently, a lift force, which is directed from a pressure side towards a suction side, acts on each of the rotor blades. The lift force generates torque on the main rotor shaft, which is typically geared to a generator for producing electricity.

Due to the nature of wind turbines continuously experiencing various loading conditions due to the changing wind, wind turbines require periodic, and often frequent, maintenance. Thus, such maintenance is typically scheduled at predetermined intervals in an effort to prevent minor damage from propagating into catastrophic damage. However, there is a possibility that damage beyond repair may occur between intervals of scheduled preventative maintenance. For example, in the event that damage occurs in the pitch bearing of a wind turbine, such damage may propagate into the hub, thereby necessitating hub replacement.

Further, certain types of damage may only be detectable visually by an operator. Accordingly, scheduled maintenance of wind turbines often requires the wind turbine to be temporarily shut down.

In view of the foregoing, the industry is continuously seeking new and improved systems and methods for detecting damage in wind turbines. Accordingly, the present disclosure is directed to systems and methods for remotely identifying cracks in wind turbine components.

BRIEF DESCRIPTION

Aspects and advantages of the disclosure will be set forth in part in the following description, or may be obvious from the description, or may be learned through practice of the disclosure.

In one aspect, the present disclosure is directed to a method for identifying damage in a component of a wind turbine. The method also includes electrically connecting the conductive element into an electrical circuit. Further, the method includes monitoring a status of the electrical circuit to identify the damage in the component. In particular, when the status of the electrical circuit is open, damage is likely present in the component, and when the status of the electrical circuit is closed, damage is unlikely present in the component. Moreover, the method includes transmitting the status of the electrical circuit to a user interface for display.

In an embodiment, placing the conductive element onto the at least one surface of the component of the wind turbine further includes placing the conductive element onto at least one of an outer surface and an inner surface of the component.

In another embodiment, placing the conductive element onto the at least one surface of the component of the wind turbine further includes placing the conductive element onto the at least one surface via at least one of printing the conductive element onto the at least one surface of the component, painting the conductive element onto the at least one surface of the component, and applying the conductive element onto the at least one surface of the component via an adhesive material.

In still another embodiment, the conductive element includes at least one of a conductive wire, conductive adhesive, conductive paint, conductive ink, a conductive sticker, or combinations thereof.

In yet another embodiment, the method further includes varying a dimension of the conductive element to achieve optimal conductivity, the dimension comprising at least one of a thickness, a length, or a width.

In a further embodiment, the conductive element comprises a grid pattern.

In still a further embodiment, the method further includes sintering the conductive element onto the at least one surface of the component of the wind turbine.

In another further embodiment, the electrical circuit further includes one or more indicator elements electrically connected to the conductive element, the one or more indicator elements configured to indicate the status of the electrical circuit.

In another embodiment, the one or more indicator elements include at least one of a light emitting diode, a sound device, a radio frequency transmission circuit, a piezoelectric element, a controls device or combinations thereof.

In still another embodiment, the one or more indicator elements include the piezoelectric element, the piezoelectric element being integrated with the conductive element, and wherein an electric current is generated by the piezoelectric element when damage occurs along the piezoelectric element In yet another embodiment, the electrical circuit further includes a flexible interconnect component electrically connecting the conductive element and the one or more indicator elements In a further embodiment, the component includes at least one of a pitch bearing or a yaw bearing of the wind turbine In still a further embodiment, placing the conductive element onto the at least one surface of the component of the wind turbine further includes encapsulating the conductive element within a substrate and placing the encapsulated conductive element upon the component of the wind turbine.

In another aspect, the present disclosure is directed to a system for identifying damage in a component of a wind turbine. The system includes at least one conductive element on at least one surface of the component of the wind turbine. The system also includes an electrical circuit electrically connected to the conductive element. Further, the system includes one or more indicator elements for indicating a status of the electrical circuit. In particular, when the one or more indicator elements indicates the status of the electrical circuit as being open, damage is likely present in the component, and when the one or more indicator elements indicates the status of the electrical circuit as being closed, damage is unlikely present in the component.

In yet another aspect, the present disclosure is directed to a method for identifying damage in a component of a wind turbine. The method includes encapsulating a conductive element within a substrate. The method also includes placing the encapsulated conductive element onto at least one surface of the component of the wind turbine. Further, the method includes connecting the conductive element to an electrical circuit. Moreover, the method includes monitoring, via one or more sensors, the conductive element for continuity. Furthermore, the method includes determining a status of the conductive element based on the continuity. In particular, when the one or more indicator elements indicates the status of the electrical circuit as being open, damage is likely present in the component, and when the one or more indicator elements indicates the status of the electrical circuit as being closed, damage is unlikely present in the component.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
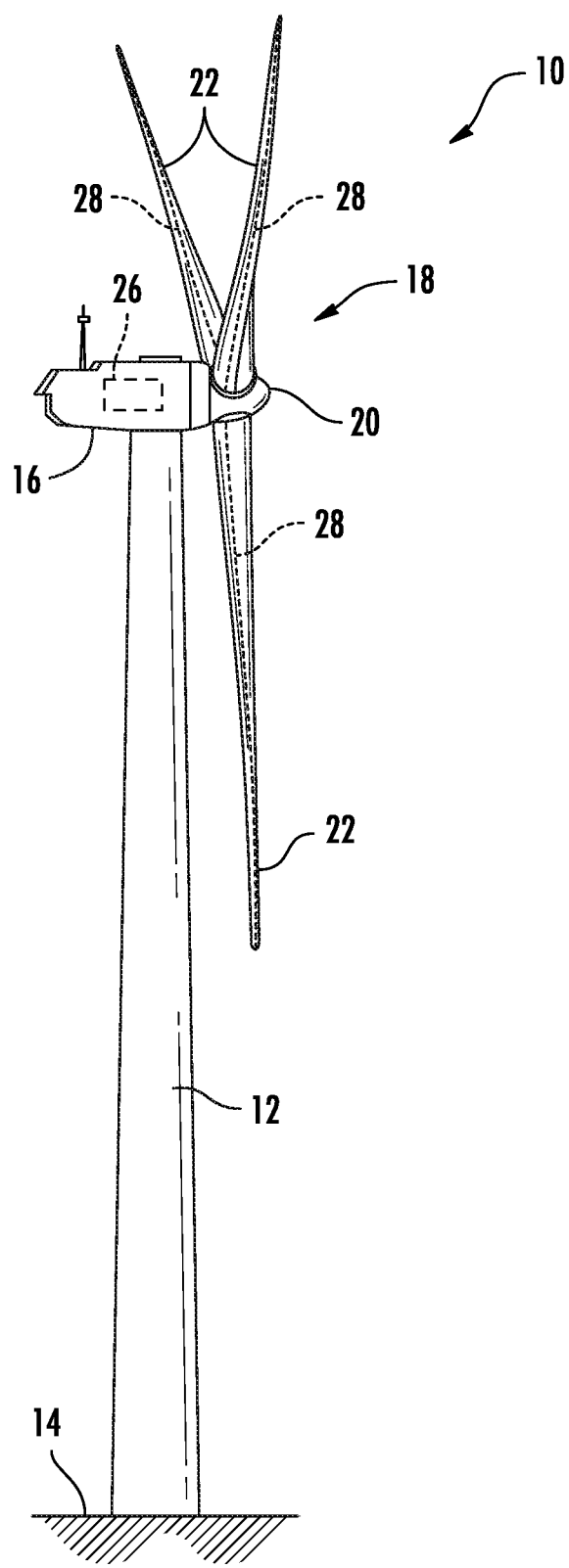
FIG. 1 illustrates a side, perspective view of an embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the disclosure, one or more examples of which are illustrated in the drawings. Each example is provided by way of explanation of the disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

In general, the present disclosure is directed to a method for identifying damage in a component of a wind turbine, such as a pitch bearing or a yaw bearing. In particular, the method of the present disclosure includes placing a conductive element onto the surface of the pitch bearing or yaw bearing. A conductive element may then be electrically connected into an electrical circuit. As such, the electrical circuit can be monitored to determine the status of the component and whether damage has occurred along the conductive element. For example, if damage has occurred along the conductive element, the electric circuit will be broken/open and no longer capable of generating a current. Alternatively, if no damage has occurred along the conductive element, the electric circuit can generate current via a closed electrical loop. Thus, in an embodiment, either of these scenarios can be readily observed and communicated to a user to inform the user whether damage has occurred along the conductive element.

Accordingly, the present disclosure provides various advantages not present in the prior art. For example, an advantage of the present disclosure is to allow for an operator to determine whether damage has occurred to a component of a wind turbine without requiring direct visualization of the particular component. Another advantage of the present disclosure is to reduce or remove the need for an operator to provide regular maintenance on a wind turbine to determine if damage has occurred. Still another advantage of the present disclosure is that an operator may be able to quickly respond to damage in a wind turbine so that the damage does not further propagate.

Referring now to the drawings, FIG. 1 illustrates a perspective view of one embodiment of a wind turbine 10 according to the present disclosure. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a wind turbine controller 26 centralized within the nacelle 16. However, in other embodiments, the controller 26 may be located within any other component of the wind turbine 10 or at a location outside the wind turbine 10. Further, the controller 26 may be communicatively coupled to any number of the components of the wind turbine 10 in order to control the operation of such components and/or implement a corrective or control action. As such, the controller 26 may include a computer or other suitable processing unit. Thus, in several embodiments, the controller 26 may include suitable computer-readable instructions that, when implemented, configure the controller 26 to perform various different functions, such as receiving, transmitting and/or executing wind turbine control signals. Accordingly, the controller 26 may generally be configured to control the various operating modes (e.g., start-up or shut-down sequences), de-rating or up-rating the wind turbine, and/or individual components of the wind turbine 10.

Figure 2:
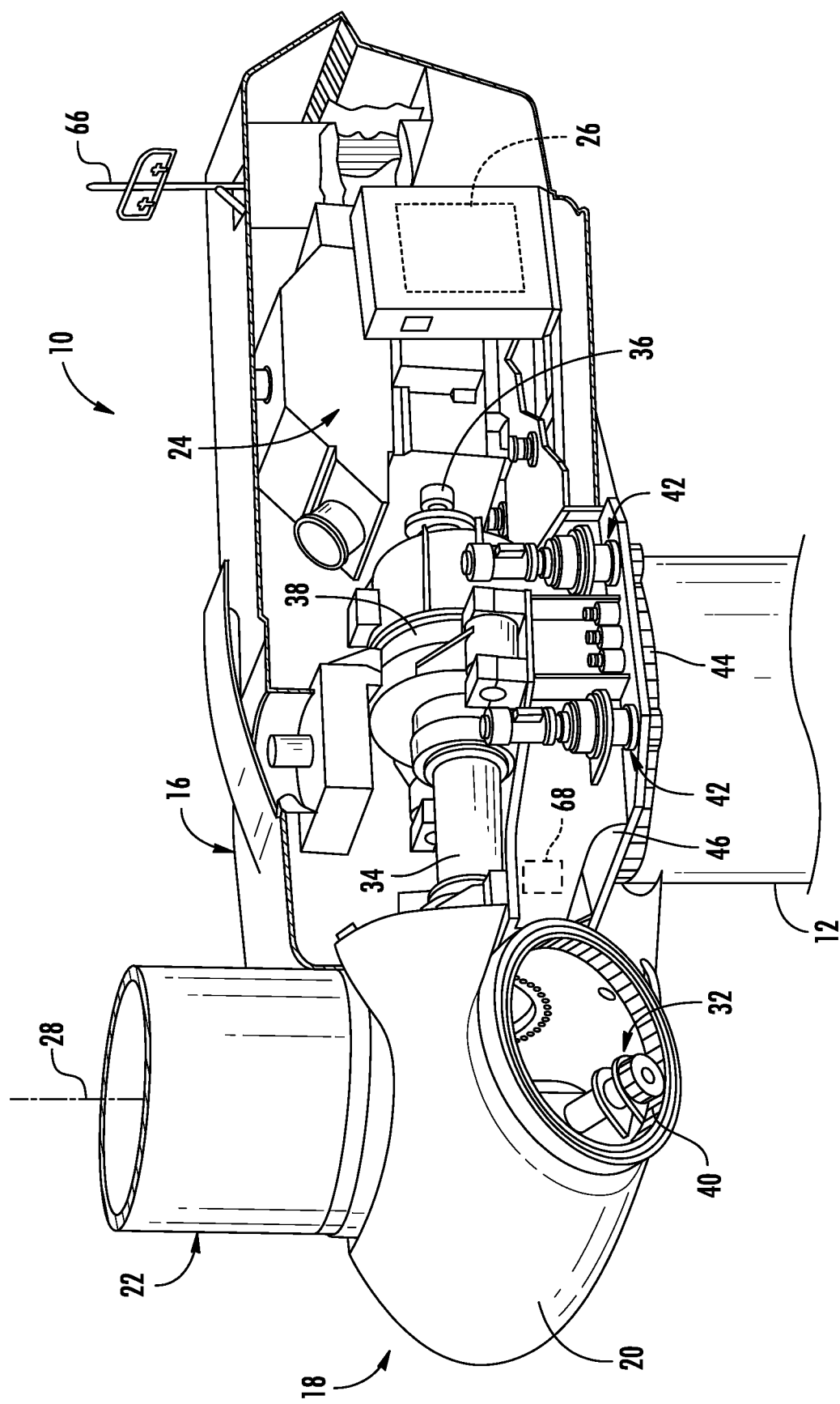
FIG. 2 illustrates an internal, perspective view of an embodiment of the nacelle of the wind turbine of FIG. 1 according to the present disclosure.

Referring now to FIG. 2, a simplified, internal view of one embodiment of the nacelle 16 of the wind turbine 10 shown in FIG. 1 is illustrated. As shown, a generator 24 may be disposed within the nacelle 16 and supported atop a bedplate 46. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

The wind turbine 10 may also one or more pitch drive mechanisms 32 communicatively coupled to the wind turbine controller 26, with each pitch adjustment mechanism(s) 32 being configured to rotate a pitch bearing 40 and thus the individual rotor blade(s) 22 about its respective pitch axis 28. In addition, as shown, the wind turbine 10 may include one or more yaw drive mechanisms 42 configured to change the angle of the nacelle 16 relative to the wind (e.g., by engaging a yaw bearing 44 of the wind turbine 10 that is arranged between the nacelle 16 and the tower 12 of the wind turbine 10).

In addition, the wind turbine 10 may also include one or more sensors 66, 68 for monitoring various wind conditions of the wind turbine 10. For example, the incoming wind direction, wind speed, or any other suitable wind condition near of the wind turbine 10 may be measured, such as through use of a suitable weather sensor 66. Suitable weather sensors may include, for example, Light Detection and Ranging ("LIDAR") devices, Sonic Detection and Ranging ("SODAR") devices, anemometers, wind vanes, barometers, radar devices (such as Doppler radar devices) or any other sensing device which can provide wind directional information now known or later developed in the art. Still further sensors 68 may be utilized to measure additional operating parameters of the wind turbine 10, such as voltage, current, vibration, etc. as described herein.

Figure 3:
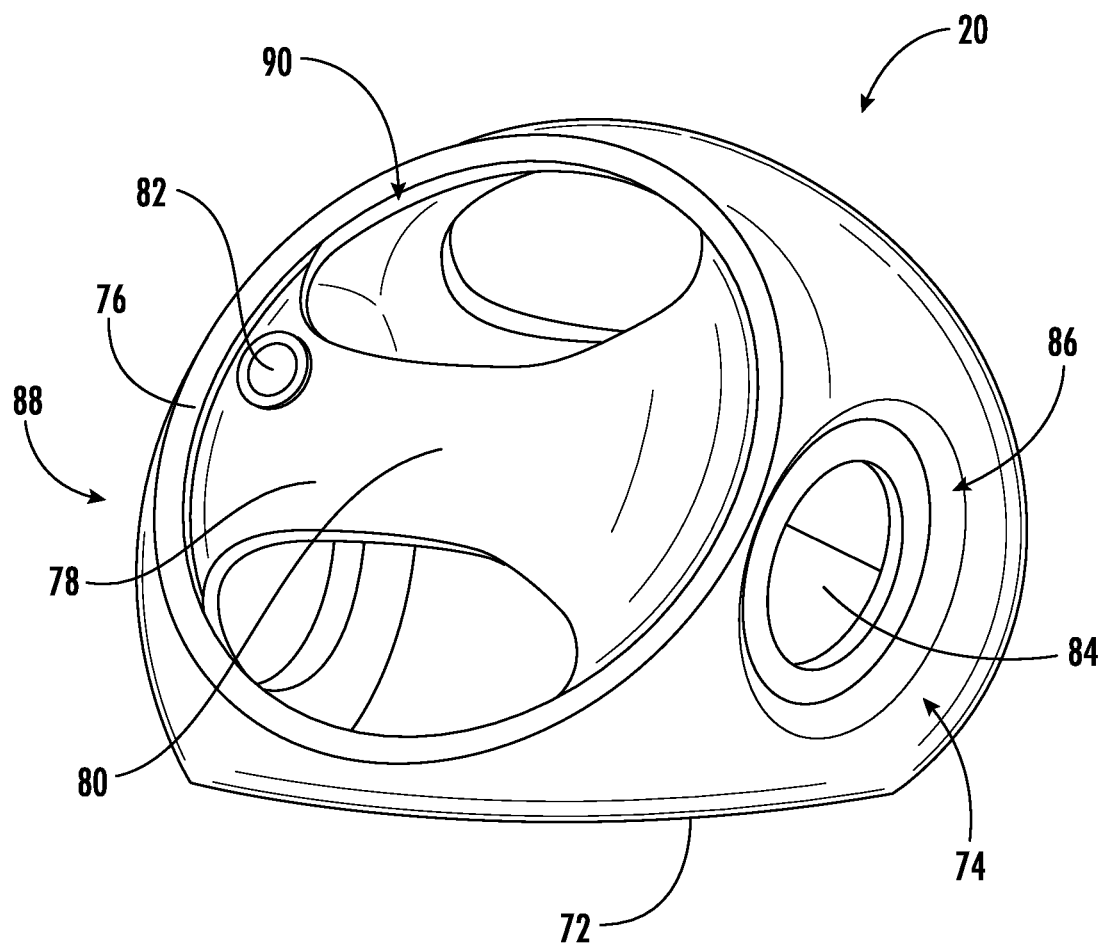
FIG. 3 illustrates a perspective view of an embodiment of a hub of the nacelle of FIG. 2 according to the present disclosure.

Referring now to FIG. 3, a perspective view of an embodiment of the hub 20 illustrated in FIGS. 1-2 is provided. As shown, the hub 20 has a hollow body 72 that may be constructed of a suitable cast material. Further, as shown, the hollow body 72 has a first end 88 and a second end 74, wherein the hollow shaft (not shown) of the wind turbine 10 is mounted to the first end 88 of the hollow body 72. Moreover, as shown, the hollow body 72 includes three flanges 76 arranged at the outside thereof for receiving and securing the rotor blades 22 in place. Thus, as shown in the illustrated embodiment, the flanges 76 may be displaced by 120°. In addition, as shown, each flange 76 may include various stiffening webs 78 integrally formed with the wall of the hollow body 72 and extending from the flange 76 radially inwardly to the center 80 of the flange area 90. The hollow body 72 of the hub 20 may also include an optional manhole 84 with a manhole flange 86 such that an operator can access an interior portion of the hollow body 72. Moreover, as shown, the stiffening web 78 may also include an aperture for receiving a pitch drive mechanism 32 therein for rotating the pitch bearing 40.

Figure 4:
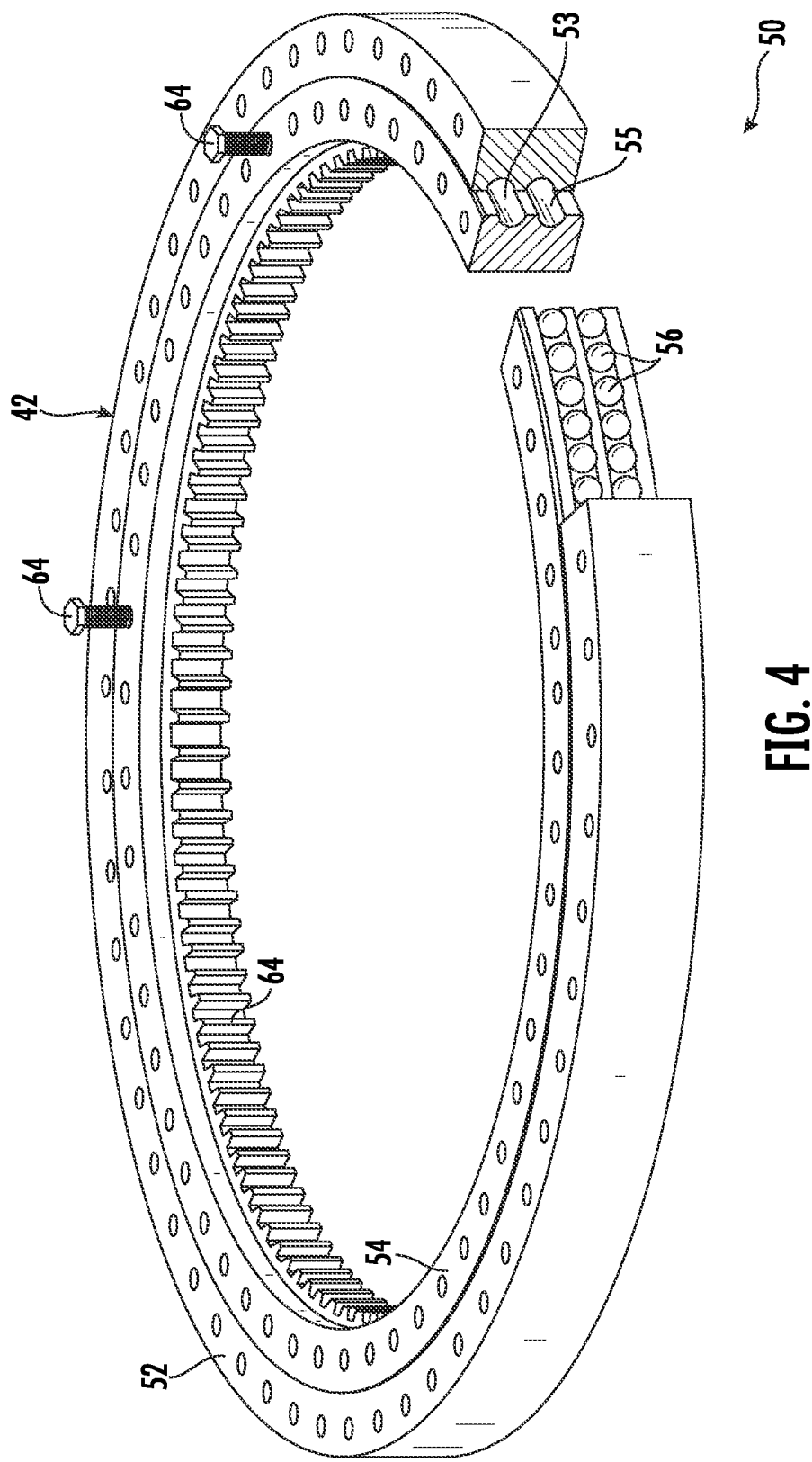
FIG. 4 illustrates a perspective view of one embodiment of a ring bearing assembly of a wind turbine according to the present disclosure.

Referring now to FIG. 4, an embodiment of a bearing assembly 50 according to the present disclosure is illustrated. It should be understood that the present disclosure is described with respect to the pitch bearing 40, but other bearing applications are within the spirit and scope of the disclosure, e.g. such as the yaw bearing 44. As shown, the bearing assembly 50 has outer race 52, inner bearing race 54, and a plurality of roller elements 56 disposed between the races 52, 54, on raceways 53, 55. As is generally understood, the outer race 52 may generally be configured to be mounted to a hub flange (such as flanges 76) of the hub 20 using a plurality of hub bolts 64 and/or other suitable fastening mechanisms. Similarly, the inner race 54 may be configured to be mounted to the rotor blade a plurality of rotor bolts.

Referring now to FIGS. 5-11, the present disclosure is generally directed to systems 200, 300, 400 and methods 100, 500 for identifying damage in a component of a wind turbine, such as the pitch bearing 40 or the yaw bearing 44. It should be understood that the damage described herein is illustrated as being present in the pitch bearing 40 and/or the yaw bearing 44, however, such damage can be present in any wind turbine component. Accordingly, the systems and methods described herein can be implemented with any suitable wind turbine component.

Figure 5:
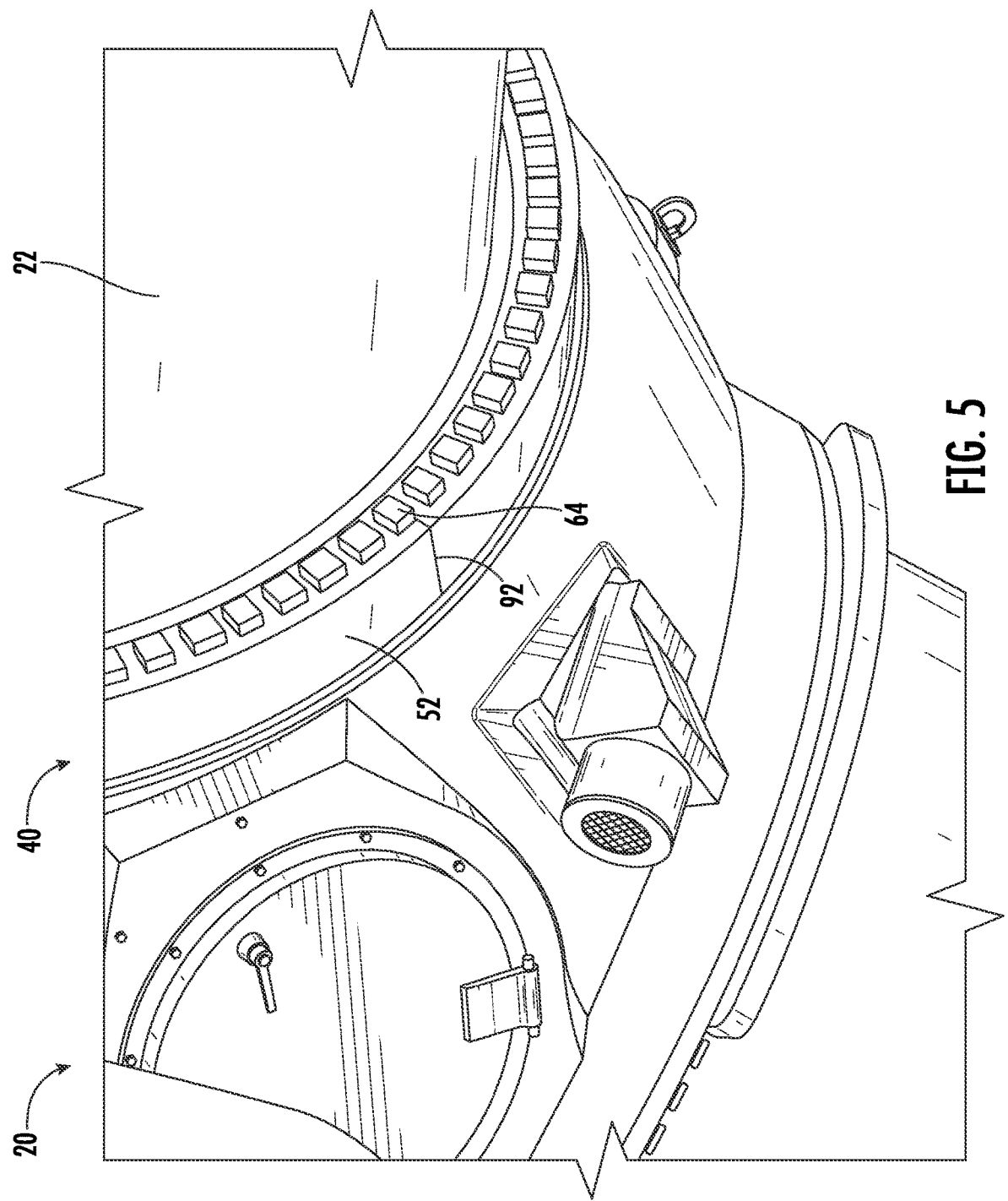
FIG. 5 illustrates a partial, perspective view of an embodiment of a pitch bearing attached to a hub of a wind turbine according to the present disclosure, particularly illustrating an example location of damage that can occur to the pitch bearing.
Figure 6:
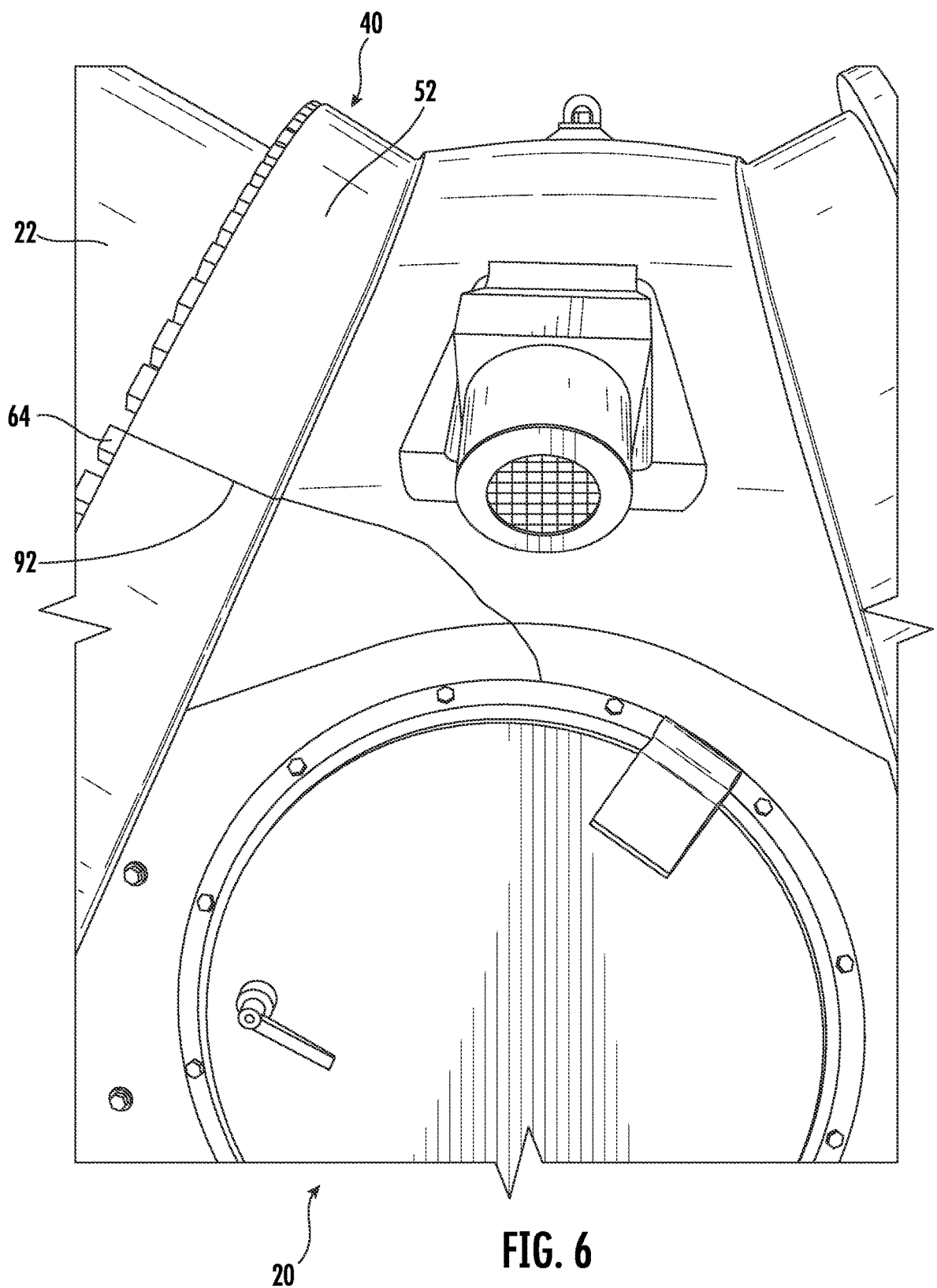
FIG. 6 illustrates another partial, perspective view of an embodiment of a pitch bearing attached to a hub of a wind turbine according to the present disclosure, particularly illustrating another example location of damage that can occur to the pitch bearing.

In particular, FIGS. 5-6 illustrate partial, perspective views of damage that has occurred to the pitch bearing 40.

More specifically, as shown in FIGS. 5-6, the damage may include a crack 92 along an outer race 52 of the pitch bearing 40. In particular, the crack may occur propagate from one of the plurality of hub bolts 64 used to attach the outer race 52 to the hub 20. Moreover, as shown particularly in FIG. 6, the crack 92 has propagated to the hub 20

Figure 7:
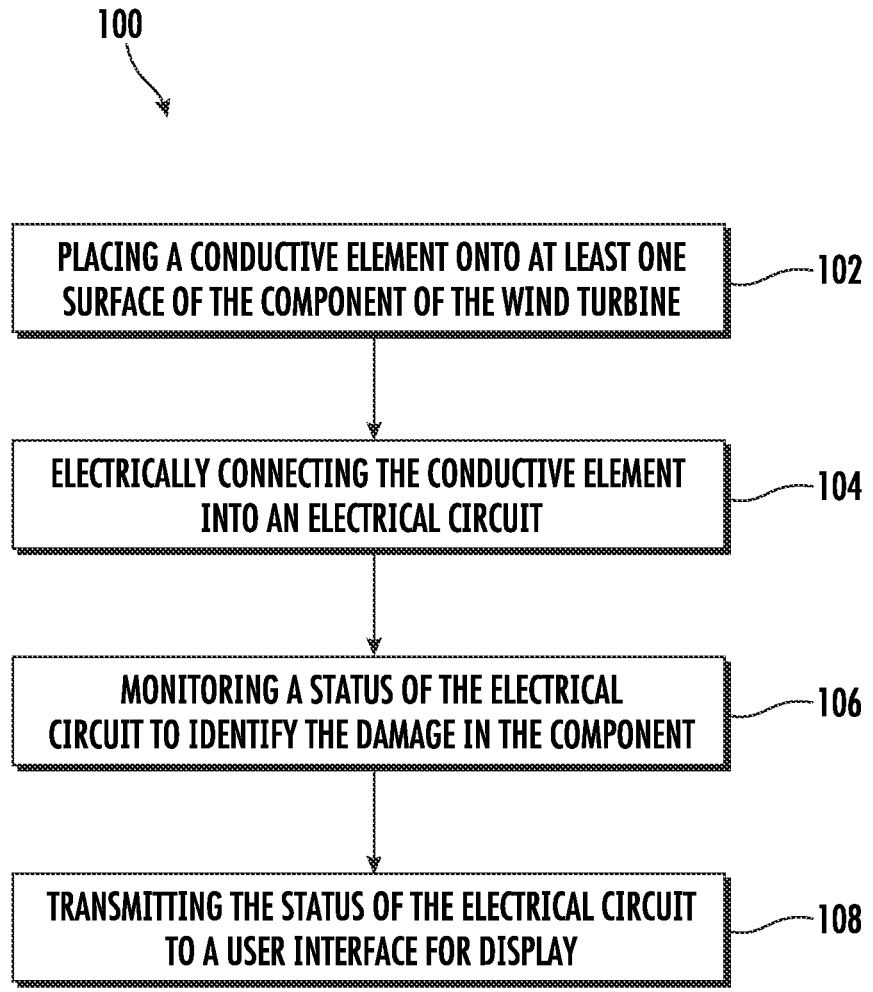
FIG. 7 illustrates a flow diagram of an embodiment of a method of identifying damage to a component of a wind turbine according to the present disclosure.

Referring now to FIG. 7, a flow diagram of an embodiment of a method 100 of identifying damage to a component of a wind turbine is illustrated. It should be appreciated that the disclosed method 100 may be implemented with any suitable wind turbine having any suitable configuration. In addition, although FIG. 7 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (102), the method 100 includes placing a conductive element onto at least one surface of the component of the wind turbine. For example, in an embodiment, the conductive element may be placed onto an outer surface of the component to assist with determining whether external damage to the component of the wind turbine has occurred. Alternatively, the conductive element may be placed on the inner surface of the component to assist in determining whether internal damage to the component of the wind turbine has occurred.

In another embodiment, the conductive element can be placed onto the component via any suitable means, such as via printing the conductive element onto the component, painting the conductive element onto the component, and/or applying the conductive element onto the component via an adhesive material.

Printing of the conductive element can include, for example, screen printing. As used herein, screen printing generally refers to a process wherein a mesh is used to transfer a material onto a substrate, such as the component. Thus, screen printing can be particularly useful when a thin coat of a conductive element is desired.

In another embodiment, painting can include, for example, standards methods of painting as well as flexographic painting. As used herein, flexographic painting generally refers to a process wherein a substrate is passed through a roller with a paint material is applied thereon. As the substrate passes through the roller, the paint material then gets applied onto the substrate.

Application of the conductive element onto the component may also include applying an adhesive material onto the component. In such embodiments, the conductive element can then either by incorporated with the adhesive material before or after the adhesive material is applied. For example, in an embodiment, a conductive material may be mixed with an adhesive material to form a mixture that can be applied onto a stamp, which can then be pressed onto a desired location of the component. A benefit of applying the conductive element in this manner is that it can be quickly and easily replicated.

Alternatively, the conductive element can be applied on top of the adhesive material. An example of this is applying a sticker with an adhesive surface onto a desired location of the component, and then applying the conductive element on top of the sticker. The conductive element can have an adhesive so it adheres to the sticker, or the sticker can have an adhesive surface on both sides so it is capable of adhering to both the component and the conductive element. A benefit of applying the conductive element in this manner is that the overall sensitivity of the overall system can be reduced if desired depending on the particular application.

In another embodiment, the method 100 may include sintering the conductive element onto the component of the wind turbine 10. For example, a conductive powder may be placed onto a component of the wind turbine 10. A radiation source may then be applied to the conductive powder. The radiation may then cause the fine particles of the conductive powder to fuse together and also fuse to the component of the wind turbine 10. Alternatively, the method 100 could include similar processes such as welding a conductive wire onto the component of the wind turbine 10.

In another embodiment, the method 100 may further include varying a dimension of the conductive element to achieve optimal conductivity. Such dimensions may include, for example, the length, width, and/or thickness of the conductive element. For example, when the width or thickness is modified, less external force may be required for the conductive element to be damaged. Thus, the methods and systems described herein may be more sensitive to changes in the condition of the component of the wind turbine 10.

Referring still to FIG. 7, as shown at (104), the method 100 further includes electrically connecting the conductive element into an electrical circuit. Further, as shown at (106), the method 100 includes monitoring a status of the electrical circuit to identify the damage in the component.

Still referring to FIG. 7, as shown at (106), the method 108 further includes transmitting the status of the electrical circuit to a user interface for display. This can inform an operator whether damage has occurred at the location of interest on the component of the wind turbine where the conductive element was placed.

Figure 8A:
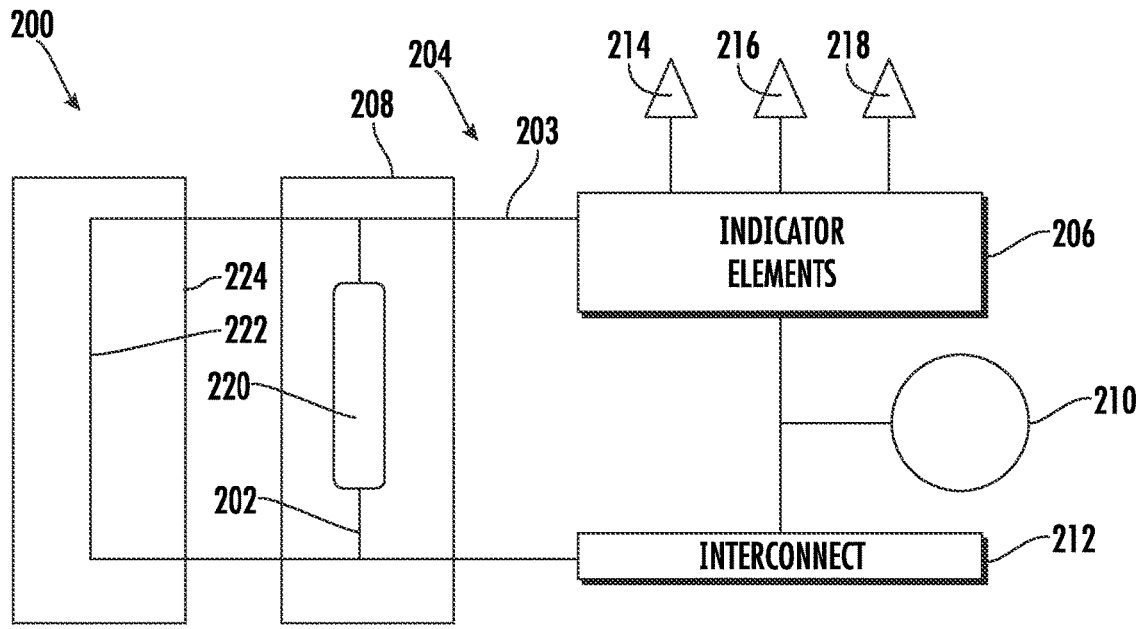
FIG. 8A illustrates a schematic diagram of an embodiment of a system of identifying damage to a component of a wind turbine according to the present disclosure.
Figure 8B:
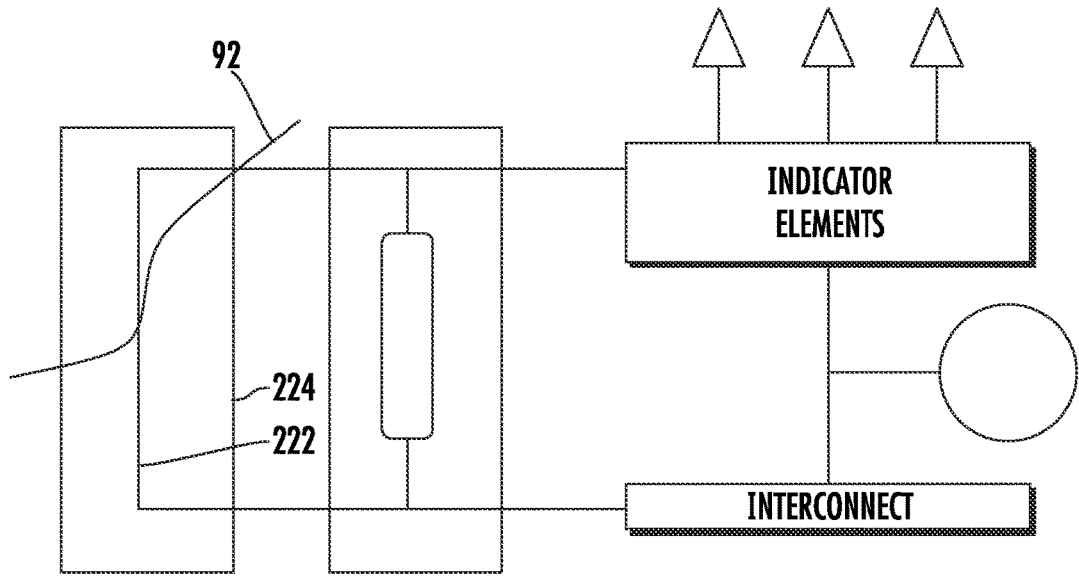
FIG. 8B illustrates a schematic diagram of the system of FIG. 8A according to the present disclosure, particularly illustrating an example of when the system of FIG. 8A identifies damage to the wind turbine component.

The aforementioned method 100 can be better understood with reference to FIGS. 8A and 8B. In particular, as shown, a system 200 of identifying damage to a component of a wind turbine is illustrated. As shown, the system 200 generally includes a conductive element 202 applied to a surface of the component 208, an electrical circuit 204 connected to the conductive element 202, and one or more indicator elements 206. Further, as stated above, the conductive elements 202, 222 can be placed on a surface of the components 208, 224 of the wind turbine 10 (FIG. 1) using any suitable means described herein.

The conductive element 202 can also be connected in parallel with a second conductive element 222 (or any further number of conductive elements connected in parallel) and applied on a second, different surface of a component 224 or a different component altogether. With this system, multiple instances of damage may be possible to determine when one conductive element is damaged resulting in an open circuit for that parallel branch. For example, if the surface of the second surface of the component or second component 224 is damaged, the second conductive element will be damaged with it resulting in that part of the electrical circuit 204 being open. Because this part of the electrical circuit 204 will be open, the current or resistance of the electrical circuit 204 may change as a result which can be determined by the indicator element 206 (discussed below). However, the conductive element 208 may not be necessarily damaged and still function as a closed part of the electrical circuit 204. This distinction may enable an operator to determine if damage has occurred at one surface or multiple surfaces of the component or multiple components based on the current or resistance of the electrical circuit 204.

In an alternative embodiment, the conductive element 202 may be encapsulated within a substrate 203. The substrate 203 may then be placed on the surface of the component 208. By encapsulating the conductive element 202 within a substrate 203, the conductive element 202 may be protected from environmental conditions which could result in the conductive element 202 incurring damage and falsely reporting damage to the component 208 of the wind turbine. In addition, the electrical circuit 204 and/or the indicator element(s) 206 may also be placed on a surface of the component 208. Alternatively, the electrical circuit 204 and/or the indicator element(s) 206 may be placed apart from the component 208.

In further embodiments, the indicator element(s) 206 are capable of providing information to an operator of whether the electrical circuit is operable and therefore capable of generating an electric current. In another embodiment, the indicator element(s) 206 may be placed in the system 200 to indicate the status of the electrical circuit 204. For example, when the component 208 is undamaged, the conductive element 202 is also unlikely to be damaged. In this example, the electrical circuit 204 is a closed circuit capable of passing a current to the indicator element(s) 206. Alternatively, when the component 208 is damaged, the conductive element 202 is also likely to be damaged. In this example, the electrical circuit 204 is an open circuit incapable of passing a current to the indicator element 206. In either of these examples, the change of status from an undamaged to a damaged component 208 or a closed circuit to an open circuit can be reported to an operator by the indicator element(s) 206. Thus, in an embodiment, the indicator element(s) 206 may be, for example, a light device 214 such as a light emitting diode ("LED"), a sound device 216 such as an alarm, and/or a radio frequency transmission ("RFT") circuit 218.

In such embodiments, an RFT circuit 218 may provide certain advantages, such as being capable of informing an operator in a remote location whether damage has occurred to the component 208. For example, when the circuit is closed, the RFT circuit 218 can be configured to transmit a signal to a remote location. However, when damage occurs to the component 208, and consequentially, the conductive element 202, the signal transmitted by the RFT circuit 218 will cease, thereby informing an operator that damage has occurred to the component 208. Alternatively, the RFT circuit 218 may have a separate, internal power source and may also be capable of transmitting a signal when the electrical circuit 204 transitions from closed to open in response to damage occurring to the component 208.

In addition, the system 200 may also optionally include a power source 210 connected to the electrical circuit 204. In such embodiments, the power source 210 can be an energy storage device (such as a battery), a generator, or any other suitable power source.

As stated above, the conductive element 202 can include a variety of materials such as a conductive wire, a conductive adhesive, a conductive paint, a conductive ink, a conductive sticker, or combinations of these materials. In addition to these materials, the conductive element 202 may also include a piezoelectric element 220 directly integrated with the conductive element 202. In such embodiments, for example, if a piezoelectric element 220 is used, the power source 210 may be eliminated. For example, in such embodiments, a piezoelectric element 220 may be capable of generating a registerable electric signal when damage to the component 208 occurs along the conductive element 202. This electric signal may then be sent to the indicator element(s) 206 to indicate the damage has occurred. For example, if the piezoelectric element 220 is used in conjunction with the RFT circuit 218 as stated above, the piezoelectric element 220 may be capable of providing an electrical signal that the RFT circuit 218, which can induce the RFT 218 circuit to send a signal to a device at a remote location. For example, the device could be one of the aforementioned indicator elements such as a light device 214 or a sound device 216 at a remote location. In addition, the device could be a user interface or computer system capable of informing an operator that damage has occurred.

In addition, the conductive element 202 can also be further modified to make the signal more readily applicable to the component 208. For example, the conductive element 202 may include a flexible material that more readily molds to the component 208. In addition, the indicator element(s) 206 and/or the power source 210 may also be applied to the component 208 via a flexible means so the indicator element(s) 206 and/or the power source 210 can more readily adhere to the component 208.

In further embodiments, the system 200 may also include an interconnect component 212. The interconnect component 212 may provide a transition from the flexible nature of the conductive element 202 to the non-flexible nature of the indicator element(s) 206 or the power source 210. In addition, the interconnect component 212 may provide additional benefits beyond providing a transition between the conductive element 202 and the indicator element(s) 206 or the power source 210. For example, if the interconnect component 212 is a standardized plug, the interconnect component could allow for connection to common control and data acquisition systems.

Figure 9A:
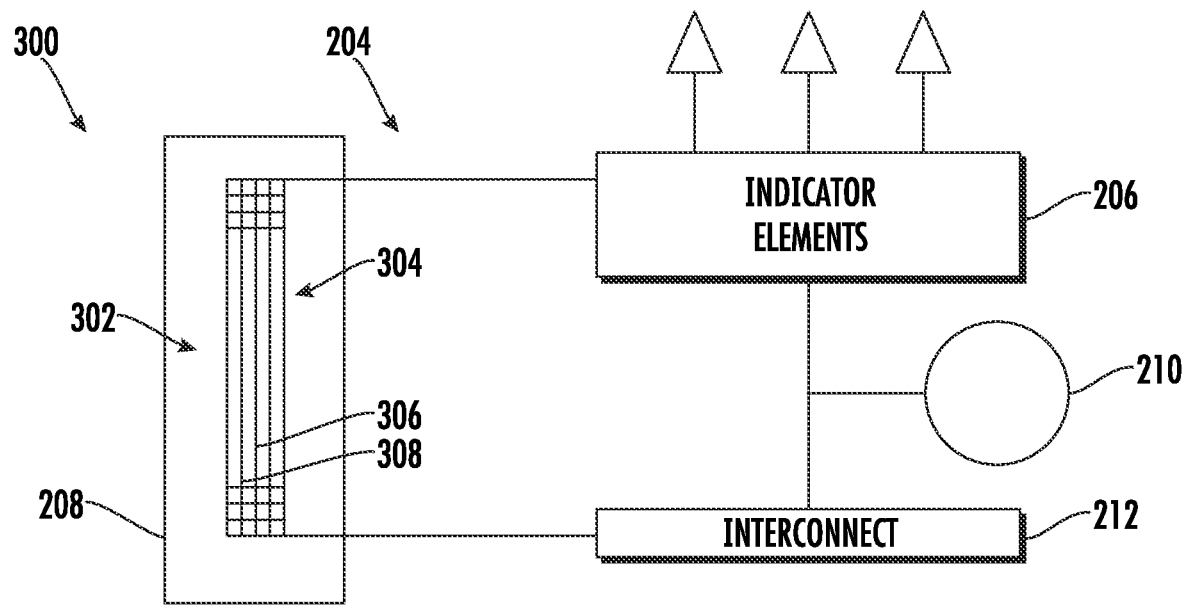
FIG. 9A illustrates a schematic diagram of another embodiment of a system of identifying damage to a component of a wind turbine according to the present disclosure.
Figure 9B:
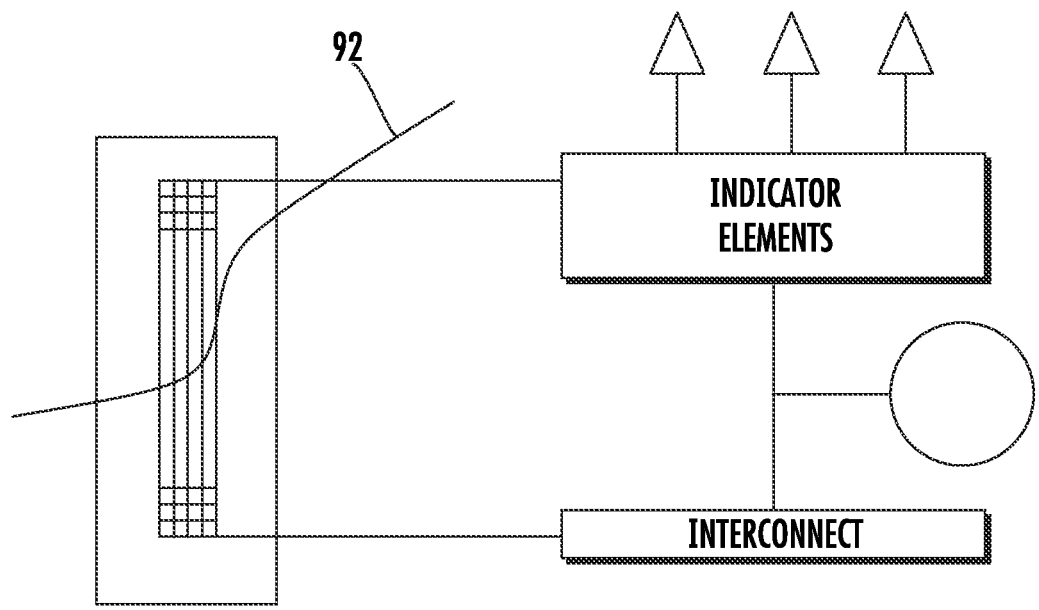
FIG. 9B illustrates a schematic diagram of the system of FIG. 9A according to the present disclosure, particularly illustrating an example of when the system of FIG. 9A identifies damage to the wind turbine component.

Referring now to FIGS. 9A and 9B, another embodiment of a system 300 for identifying damage to a component is illustrated. As shown, the system 300 may share many features with the system of FIGS. 8A and 8B, and such common features are given the same numerals. However, as shown, the system 300 of FIGS. 9A and 9B includes a conductive element 302 having a grid pattern. In such embodiments, the conductive element 302 may include several conductive pathways 304 that can pass electrical current. Thus, the various grid patterns of the conductive element 302 can provide greater sensitivity to the system 300. For example, when damage occurs along the component 208 of the wind turbine 10, one of the conductive pathways 304 may be damaged as a result of this damage. In this scenario, the break in the conductive pathway(s) 304 causes a change in the electrical signal sent to the indicator element(s) 206, such as a decrease in the overall electrical current sent to the indicator element(s) 206. This change in the electrical signal may then be indicated by the indicator element(s) 206 using means as discussed above.

Another potential benefit of the conductive element 302 is that the grid pattern may be capable of registering multiple instances of damage occurring to the component 208. For example, when a first instance of damage occurs to the component 208, a first conductive pathway 306 may be broken and indicated by the indicator element(s) 206. If a second instance of damage occurs to the component 208, a second conductive pathway 308 may be broken. In this scenario, the electrical signal further changes as compared to the first instance of damage. This second change in the electrical signal can then be indicated via the indicator element(s) 206.

Figure 10A:
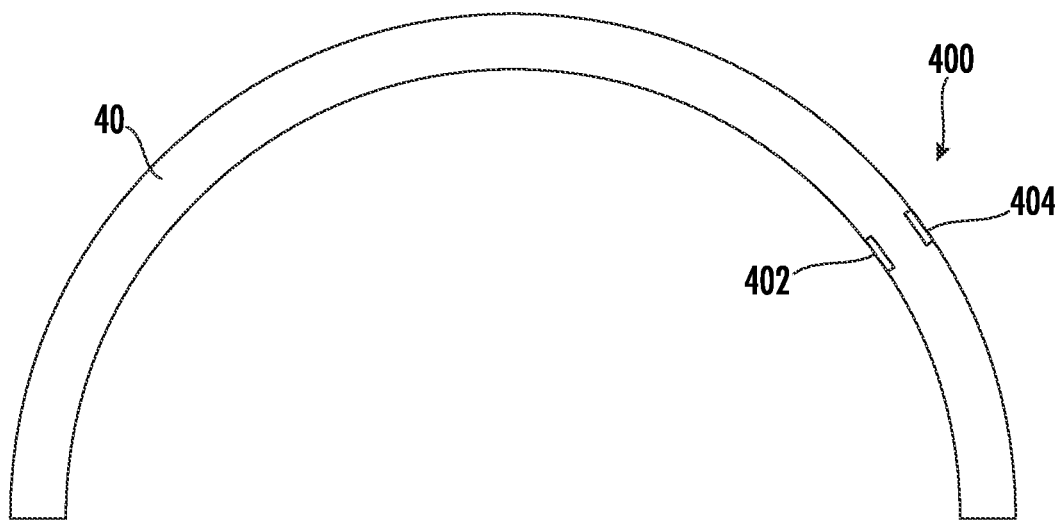
FIG. 10A illustrates a partial view of a pitch bearing of a wind turbine according to the present disclosure, particularly illustrating a system for identifying damage on the pitch bearing.
Figure 10B:
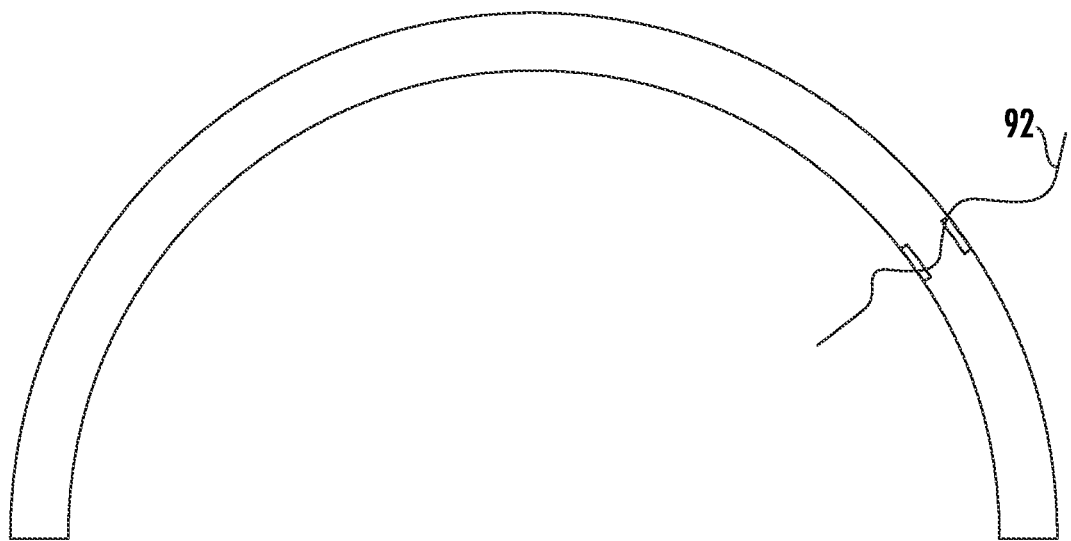
FIG. 10B illustrates a partial view of a pitch bearing of a wind turbine and the system of FIG. 9A according to the present disclosure, particularly illustrating an example of when the system of FIG. 10A identifies damage on the pitch bearing.

Referring now to FIGS. 10A and 10B, the system 200 is shown applied to the pitch bearing 40 of the wind turbine 10. However, it should be understood that the system 400 can be applied in other suitable locations as well. For example, the system 400 may be applied to the yaw bearing 44 or the support surface of the wind turbine 10. It should be understood that the system 400 can include the system 200 and its various embodiments or the system 300 and its various embodiments. In addition, as shown the system 400 may be applied to the interior surface 402 and the exterior surface 404 of the pitch bearing 40. As stated above, such a configuration may allow for the detection of both internal damage and external damage on the component of the wind turbine 10 when a crack 92 occurs, for example.

Figure 11:
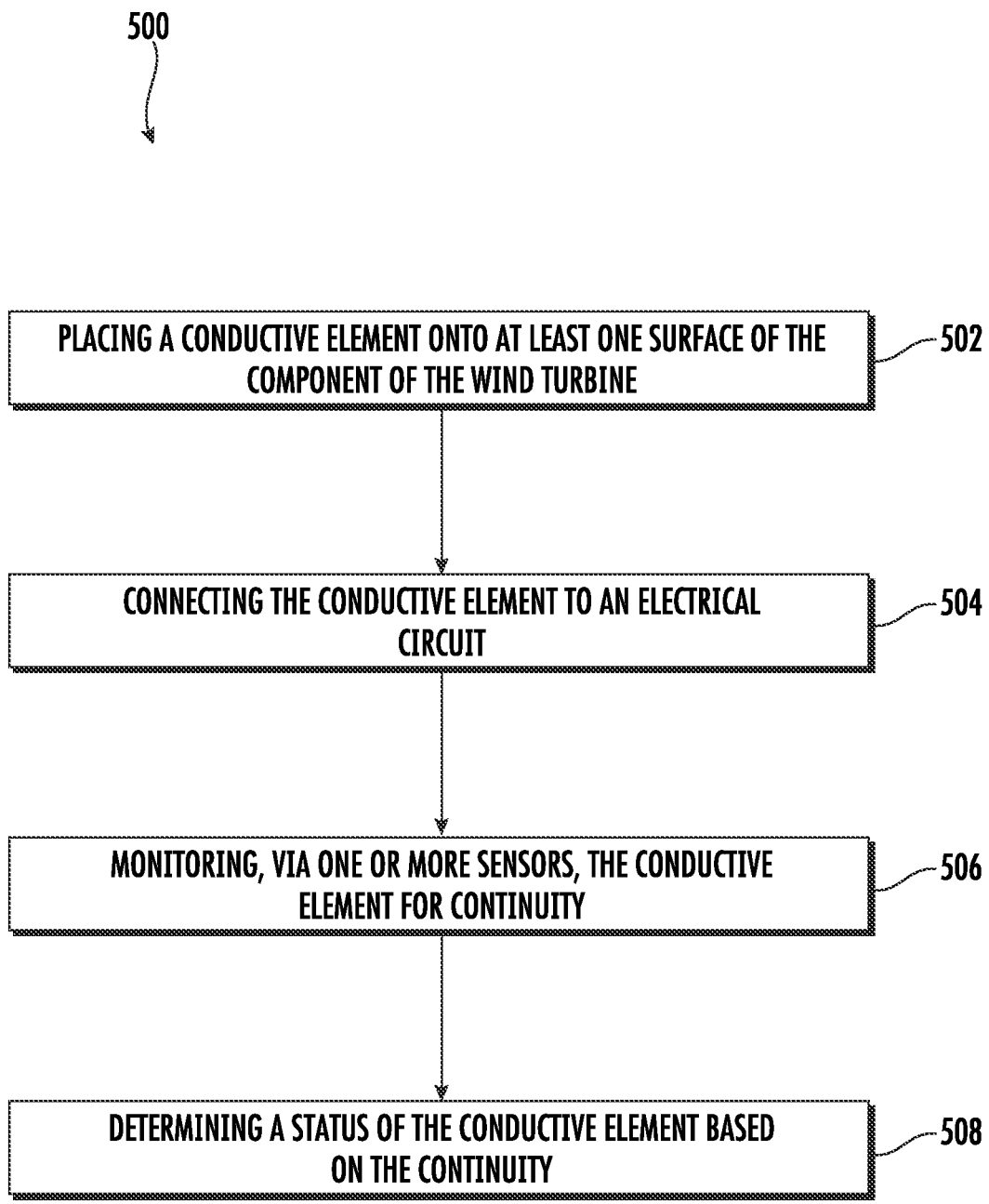
FIG. 11 illustrates a flow diagram of another embodiment of a method for identifying damage in a component of a wind turbine according to the present disclosure.

Referring now to FIG. 11, a flow diagram of another embodiment of a method 500 for identifying damage in a component of a wind turbine, such as wind turbine 10, is illustrated. It should be appreciated that the disclosed method 100 may be implemented with any suitable wind turbine having any suitable configuration. In addition, although FIG. 11 depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure As shown at (502), the method 500 includes placing a conductive element onto at least one surface of the component of the wind turbine. As shown at (504), the method 500 may further include connecting the conductive element to an electric circuit. Further, as shown at (506), the method 500 includes monitoring, via one or more sensors, the conductive element for continuity. Further still, as shown at (508), the method 500 includes determining a status of the conductive element based on the continuity. In the method 500, it should be understood that when there is continuity in the conductive element, damage is unlikely present in the component, and when there is no continuity in the conductive element, damage is likely present in the component.

Various aspects and embodiments of the present disclosure are defined by the following numbered clauses:

Clause 1: A method for identifying damage in a component of a wind turbine, the method comprising:
placing a conductive element onto at least one surface of the component of the wind turbine;
electrically connecting the conductive element into an electrical circuit;
monitoring a status of the electrical circuit to identify the damage in the component, wherein, when the status of the electrical circuit is open, damage is likely present in the component, and wherein, when the status of the electrical circuit is closed, damage is unlikely present in the component; and
transmitting the status of the electrical circuit to a user interface for display.

Clause 2: The method of clause 1, wherein placing the conductive element onto the at least one surface of the component of the wind turbine further comprises placing the conductive element onto at least one of an outer surface and an inner surface of the component Clause 3: The method of clause 2, wherein placing the conductive element onto the at least one surface of the component of the wind turbine further comprises placing the conductive element onto the at least one surface via at least one of printing the conductive element onto the at least one surface of the component, painting the conductive element onto the at least one surface of the component, and applying the conductive element onto the at least one surface of the component via an adhesive material.

Clause 4: The method of any of the preceding clauses, wherein the conductive element comprises at least one of a conductive wire, conductive adhesive, conductive paint, conductive ink, a conductive sticker, or combinations thereof.

Clause 5: The method of any of the preceding clauses further comprising varying a dimension of the conductive element to achieve optimal conductivity, the dimension comprising at least one of a thickness, a length, or a width.

Clause 6: The method of any of the preceding clauses, wherein the conductive element comprises a grid pattern.

Clause 7: The method of any of the preceding clauses further comprising sintering the conductive element onto the at least one surface of the component of the wind turbine.

Clause 8: The method of any of the preceding clauses, wherein the electrical circuit further comprises one or more indicator elements electrically connected to the conductive element, the one or more indicator elements configured to indicate the status of the electrical circuit.

Clause 9: The method of clause 8, wherein the one or more indicator elements comprises at least one of a light emitting diode, a sound device, a radio frequency transmission circuit, a piezoelectric element, a controls device or combinations thereof.

Clause 10: The method of clause 9, wherein the one or more indicator elements comprise the piezoelectric element, the piezoelectric element being integrated with the conductive element, and wherein an electric current is generated by the piezoelectric element when damage occurs along the piezoelectric element.

Clause 11: The method of clause 8, wherein the electrical circuit further comprises a flexible interconnect component electrically connecting the conductive element and the one or more indicator elements.

Clause 12: The method of any of the preceding clauses, wherein the component comprises at least one of a pitch bearing or a yaw bearing of the wind turbine.

Clause 13: The method of any of the preceding clauses, wherein placing the conductive element onto the at least one surface of the component of the wind turbine further comprises encapsulating the conductive element within a substrate and placing the encapsulated conductive element upon the component of the wind turbine.

Clause 14: A system for identifying damage in a component of a wind turbine, the system comprising:
at least one conductive element on at least one surface of the component of the wind turbine;
an electrical circuit electrically connected to the conductive element; and
one or more indicator elements for indicating a status of the electrical circuit,
wherein, when the one or more indicator elements indicates the status of the electrical circuit as being open, damage is likely present in the component, and wherein, when the one or more indicator elements indicates the status of the electrical circuit as being closed, damage is unlikely present in the component.

Clause 15: The system of clause 14 wherein the conductive element comprises at least one of a conductive wire, conductive adhesive, conductive paint, conductive ink, a conductive sticker, or combinations thereof.

Clause 16: The system of clauses 14-15, wherein the conductive element has a varying dimension to achieve optimal conductivity, the varying dimension comprising at least one of a thickness, a length, or a width.

Clause 17: The system of clauses 14-16, wherein the one or more indicator elements comprise at least one of a light emitting diode, a sound device, a radio frequency transmission circuit, or combinations thereof.

Clause 18: The system of clauses 14-17, wherein the component comprises at least one of a pitch bearing or a yaw bearing of the wind turbine, wherein the at least one surface comprises an outer surface and an inner surface of the pitch bearing or a yaw bearing of the wind turbine.

Clause 19: The system of clauses 14-18, wherein the electric circuit further comprises one or more components capable of providing power, wherein the one or more components capable of providing power comprises a piezoelectric element integrated with the conductive element, wherein an electric current is generated when damage occurs along the piezoelectric element.

Clause 20: A method for identifying damage in a component of a wind turbine, the method comprising:
encapsulating a conductive element within a substrate;
placing the encapsulated conductive element onto at least one surface of the component of the wind turbine;
connecting the conductive element to an electrical circuit;
monitoring, via one or more sensors, the conductive element for continuity;
determining a status of the conductive element based on the continuity, wherein, when there is continuity in the conductive element, damage is unlikely present in the component, and wherein, when there is no continuity in the conductive element, damage is likely present in the component; and
transmitting the status of the electrical circuit to a user interface for display.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for identifying damage in a component of a wind turbine, the method comprising:
   placing a conductive element onto at least one surface of the component of the wind turbine, wherein the component comprises at least one of a pitch bearing or a yaw bearing of the wind turbine, wherein the at least one surface comprises an outer surface and an inner surface of the pitch bearing or a yaw bearing of the wind turbine;
   electrically connecting the conductive element into an electrical circuit;
   monitoring a status of the electrical circuit to identify the damage in the component, wherein, when the status of the electrical circuit is open, damage is likely present in the component, and wherein, when the status of the electrical circuit is closed, damage is unlikely present in the component; and
   transmitting the status of the electrical circuit to a user interface for display.

2. The method of claim 1, wherein placing the conductive element onto the at least one surface of the component of the wind turbine further comprises placing the conductive element onto at least one of an outer surface and an inner surface of the component.

3. The method of claim 1, wherein placing the conductive element onto the at least one surface of the component of the wind turbine further comprises placing the conductive element onto the at least one surface via at least one of printing the conductive element onto the at least one surface of the component, painting the conductive element onto the at least one surface of the component, and applying the conductive element onto the at least one surface of the component via an adhesive material.

4. The method of claim 1, wherein the conductive element comprises at least one of a conductive wire, conductive adhesive, conductive paint, conductive ink, a conductive sticker, or combinations thereof.

5. The method of claim 1 further comprising varying a dimension of the conductive element to achieve optimal conductivity, the dimension comprising at least one of a thickness, a length, or a width.

6. The method of claim 1, wherein the conductive element comprises a grid pattern.

7. The method of claim 1 further comprising sintering the conductive element onto the at least one surface of the component of the wind turbine.

8. The method of claim 1, wherein the electrical circuit further comprises one or more indicator elements electrically connected to the conductive element, the one or more indicator elements configured to indicate the status of the electrical circuit.

9. The method of claim 8, wherein the one or more indicator elements comprise at least one of a light emitting diode, a sound device, a radio frequency transmission circuit, a piezoelectric element, a controls device or combinations thereof.

10. The method of claim 9, wherein the one or more indicator elements comprise the piezoelectric element, the piezoelectric element being integrated with the conductive element, and wherein an electric current is generated by the piezoelectric element when damage occurs along the piezoelectric element.

11. The method of claim 8, wherein the electrical circuit further comprises a flexible interconnect component electrically connecting the conductive element and the one or more indicator elements.

12. The method of claim 1, wherein the component comprises at least one of a pitch bearing or a yaw bearing of the wind turbine.

13. The method of claim 1, wherein placing the conductive element onto the at least one surface of the component of the wind turbine further comprises encapsulating the conductive element within a substrate and placing the encapsulated conductive element upon the component of the wind turbine.

14. A system for identifying damage in a component of a wind turbine, the system comprising:
   at least one conductive element on at least one surface of the component of the wind turbine, wherein the component comprises at least one of a pitch bearing or a yaw bearing of the wind turbine, wherein the at least one surface comprises an outer surface and an inner surface of the pitch bearing or a yaw bearing of the wind turbine;

an electrical circuit electrically connected to the conductive element; and one or more indicator elements for indicating a status of the electrical circuit, wherein, when the one or more indicator elements indicates the status of the electrical circuit as being open, damage is likely present in the component, and wherein, when the one or more indicator elements indicates the status of the electrical circuit as being closed, damage is unlikely present in the component.

15. The system of claim 14, wherein the conductive element comprises at least one of a conductive wire, conductive adhesive, conductive paint, conductive ink, a conductive sticker, or combinations thereof.

16. The system of claim 14, wherein the conductive element has a varying dimension to achieve optimal conductivity, the varying dimension comprising at least one of a thickness, a length, or a width.

17. The system of claim 14, wherein the one or more indicator elements comprise at least one of a light emitting diode, a sound device, a radio frequency transmission circuit, or combinations thereof.

18. The system of claim 14, wherein the electric circuit further comprises one or more components capable of providing power, wherein the one or more components capable of providing power comprises a piezoelectric element integrated with the conductive element, wherein an electric current is generated when damage occurs along the piezoelectric element.

19. A method for identifying damage in a component of a wind turbine, the method comprising:

encapsulating a conductive element within a substrate;

placing the encapsulated conductive element onto at least one surface of the component of the wind turbine, wherein the component comprises at least one of a pitch bearing or a yaw bearing of the wind turbine, wherein the at least one surface comprises an outer surface and an inner surface of the pitch bearing or a yaw bearing of the wind turbine;

connecting the conductive element to an electrical circuit;

monitoring, via one or more sensors, the conductive element for continuity;

determining a status of the conductive element based on the continuity, wherein, when there is continuity in the conductive element, damage is unlikely present in the component, and wherein, when there is no continuity in the conductive element, damage is likely present in the component; and transmitting the status of the electrical circuit to a user interface for display.

* * * * *